UNITED STATES PATENT OFFICE.

OSCAR DRESSEL AND MYRTIL KAHN, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

No. 843,077.  Specification of Letters Patent.  Patented Feb. 5, 1907.

Application filed November 6, 1906. Serial No. 342,286.

*To all whom it may concern:*

Be it known that we, OSCAR DRESSEL and MYRTIL KAHN, citizens of the German Empire, Kingdom of Prussia, residing at Elberfeld, Germany, have invented new and useful Improvements in new Azo Dyes, of which the following is a specification.

This invention relates to the manufacture and production of new azo dyestuffs prepared from the hitherto unknown 5-nitro-4-chloro-2-aminophenol and sulfonic acids of naphtholic compounds, such as sulfonic acids of naphthols, dioxynaphthalenes, aminonaphthols or their substitution derivatives, or the like.

The 5-nitro-4-chloro-2-aminophenol is obtained by treating with nitrating agents the ethenyl derivative of the 4-chloro-2-aminophenol. (See *American Chemical Journal*, Vol. 32, page 42.) The nitro-ethenyl compound thus obtained (M. P. 148°–149° centigrade) yields on boiling with dilute mineral acids the 5-nitro-4-chloro-2-aminophenol. It can be also obtained by treating the 4-chloro-2-aminophenol itself with nitrating agents. In this case, however, its isomer, the known 6-nitro-4-chloro-2-aminophenol is formed simultaneously with the 5-nitro-4-chloro-2-aminophenol.

The 5-nitro-4-chloro-2-aminophenol forms yellow needles soluble in alcohol. On being heated over 200° they grow darker and melt at about 225° centigrade with evolution of gas.

The new dyestuffs are in the shape of their alkaline salts dark powders soluble in water, yielding upon reduction with stannous chlorid and hydrochloric acid 2-5-diamino-4-chlorophenol and sulfonic acids of aminonaphtholic compounds, dyeing wool from acid-baths generally from red to violet shades which are changed to green to blue to black when chromed after dyeing.

In carrying out the new process practically the following examples are given, the parts being by weight.

Example 1: A mixture of six parts of nitric acid (40° Baumé) and nine parts of sulfuric acid monohydrate are slowly stirred into a solution of ten parts of ethenyl-4-chloro-2-aminophenol

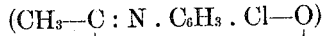

$(CH_3—C : N . C_6H_3 . Cl—O)$ in thirty parts of sulfuric-acid monohydrate. To complete the reaction, the temperature is allowed to rise to 30° to 40° centigrade for a short time. The mixture of the reaction is then poured into ice-water, when the nitro product will be separated. For saponification of the nitro compound it is boiled with twelve times its quantity of a twenty-percent. sulfuric acid until all is entered into solution. The 5-nitro-4-chloro-2-aminophenol is then precipitated from the mass of the reaction by the addition of sodium carbonate or sodium acetate. It is filtered off and dried. On nitrating the 4-chloro-2-aminophenol a mixture of two isomeric nitro compounds is obtained. The 5-nitro-4-chloro-2-aminophenol can be separated from the 6-nitro-4-chloro-2-aminophenol by a fractional crystallization from alcohol. The 6-nitro-4-chloro-2-aminophenol deposits first, and the 5-nitro-4-chloro-2-aminophenol can be isolated from the alcoholic solution. 18.9 parts of 5-nitro-4-chloro-2-aminophenol are diazotized in the usual manner by means of hydrochloric acid and seven parts of sodium nitrite. The diazo compound, which is partly precipitated in the shape of yellowish-red crystals, is then poured into a solution of 24.6 parts of the sodium salt of 1-naphthol-4-sulfonic acid, to which sufficient sodium carbonate has been added to maintain the reaction strongly alkaline throughout the whole process. After some hours the dyestuff, which has separated out almost entirely, is completely precipitated by the addition of common salt, filtered off and dried. It dyes wool from acid-baths red shades which on chroming change to a dark navy blue.

Example 2: 18.9 parts of 5 nitro-4-chloro-2-aminophenol are diazotized in the usual way and then combined with thirty-two parts of 2-phenylamino-5 naphthol-7-sulfonic acid dissolved in an excess of a sodium-carbonate solution. The dyestuff separates completely after a short time. It is in the shape of its sodium salt after being dried and pulverized a dark powder soluble in water with a violet color; soluble in concentrated sulfuric acid with a bluish-red color. By reduction with stannous chlorid and hydrochloric acid 2-5-diamino-4-chlorophenol and 2-phenylamino-5-napthol-6-amino-7-sulfonic acid is obtained. It dyes wool from acid-baths bordeaux, which on being chromed after dyeing is changed to a clear and fast blue similar to indigo.

The process is carried out in an analogous manner on using other sulfonic acids of naphtholic compounds, such as other naphthol, dioxynaphthalene, or aminonaphthol sulfonic acids or derivatives thereof as one of the components for the production of the new dyes.

| Dyestuff from the diazo compound of 5-nitro-4-chloro-2-aminophenol. | Dyes wool when chromed after dyeing. |
|---|---|
| 1. 1-naphthol-4-sulfonic acid | Reddish blue. |
| 2. 1-naphthol-5-sulfonic acid | Greenish blue. |
| 3. 1-naphthol-3.6-disulfonic acid | Dark blue. |
| 4. 2-naphthol-6-sulfonic acid | Reddish blue. |
| 5. 2-naphthol-7-sulfonic acid | Black. |
| 6. 2-naphthol-3.6-disulfonic acid | Reddish blue. |
| 7. 1.8-aminonaphthol-4-sulfonic acid | Green. |
| 8. 1.8-aminonaphthol-3.6-disulfonic acid | Green. |
| 9. 2-amino-5-naphthol-7-sulfonic acid | Blue. |
| 10. 2-phenylamino-5-naphthol-7-sulfonic acid | Blue. |
| 11. 2-amino-8-naphthol-6-sulfonic acid | Reddish blue. |
| 12. 1.8-dioxynaphthalene-4-sulfonic acid | Greenish blue. |
| 13. 1.6-dioxynaphthalene-3-sulfonic acid | Dark blue. |
| 14. 1.8-dioxynaphthalene-3.6-disulfonic acid | Greenish blue. |

Having now described our invention and in what manner the same is to be performed, what we claim is—

1. The herein-described new azo dyestuffs obtainable by combining the diazo compound of 5-nitro-4-chloro-2-aminophenol with sulfonic acids of naphtholic compounds, which dyestuffs are, after being dried and pulverized, in the shape of their alkaline salts dark powders soluble in water; yielding upon reduction with stannous chlorid and hydrochloric acid 2-5-diamino-4-chlorophenol and sulfonic acids of aminonaphtholic compounds; and dyeing wool from acid-baths generally from red to violet shades, which on chroming change to from green to blue to black, substantially as hereinbefore described.

2. The herein-described new azo dyestuff obtainable by combining the diazo compound of 5-nitro-4-chloro-2-aminophenol with 2-phenylamino-5-naphthol-7-sulfonic acid, which dyestuff is, after being dried and pulverized, in the shape of its sodium salt a dark powder soluble in water with a violet color and in concentrated sulfuric acid with a bluish-red color; yielding upon reduction with stannous chlorid and hydrochloric acid 2-5-diamino-4-chlorophenol and 2-phenylamino-5-naphthol-6-amino-7-sulfonic acid; and dyeing wool from acid-baths bordeaux shades which are changed to blue when chromed after dyeing, substantially as hereinbefore described.

In testimony whereof we have hereunto set our hands in the presence of two subscribing witnesses.

OSCAR DRESSEL.
MYRTIL KAHN.

Witnesses:
OTTO KÖNIG,
J. A. RITTERSHAUS.